United States Patent
Wood, Jr.

(10) Patent No.: US 7,352,816 B2
(45) Date of Patent: Apr. 1, 2008

(54) DATA OVERSAMPLING VIA CLOCK AND DATA INTERPOLATION

(75) Inventor: Reed Glenn Wood, Jr., Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 694 days.

(21) Appl. No.: 10/826,116

(22) Filed: Apr. 16, 2004

(65) Prior Publication Data
US 2005/0232366 A1 Oct. 20, 2005

(51) Int. Cl.
*H04B 3/00* (2006.01)
(52) U.S. Cl. .............. 375/257; 327/141; 327/165; 348/538; 365/242; 370/395.62; 375/371; 375/373; 398/155
(58) Field of Classification Search ............. 375/257, 375/355, 376, 371, 373; 327/144, 119, 147, 327/165; 714/747
See application file for complete search history.

(56) References Cited

U.S. PATENT DOCUMENTS

| | | | |
|---|---|---|---|
| 5,012,494 A * | 4/1991 | Lai et al. ............. | 375/376 |
| 6,002,279 A * | 12/1999 | Evans et al. ............. | 327/144 |
| 2001/0053187 A1* | 12/2001 | Simon et al. ............. | 375/257 |
| 2003/0002607 A1* | 1/2003 | Mooney et al. ............. | 375/355 |

* cited by examiner

*Primary Examiner*—David C. Payne
*Assistant Examiner*—Adolf DSouza

(57) ABSTRACT

An oversampling delay is provided between clock and data signals by steering a current between first and second nodes. The first node is coupled to an input differential pair of a clock interpolator and a delayed differential pair of a data interpolator. The second node is coupled to an input differential pair of the data interpolator and a delayed differential pair of the clock interpolator. First clock and data signals are provided to a first data sampling element and, respectively, to the clock and data interpolators. Second clock and data signals, respectively output from the clock and data interpolators, are provided to a second data sampling element. Additional data sampling elements may be linked to form a longer chain of data sampling elements.

9 Claims, 3 Drawing Sheets

DATA OVERSAMPLING VIA CLOCK AND DATA INTERPOLATION

BACKGROUND

Oversampling is a useful technique for extracting timing information such as frequency, phase, or skew from a signal or series of signals. It is frequently employed in data recovery systems.

Oversampling is often accomplished by 1) providing a common data signal to each of a number of flip-flops, 2) generating multiple phases of a base clock (e.g., using a tapped delay line, a tapped ring oscillator, or a delay locked loop (DLL)), and then 3) providing each of the clock phases to a different one of the flip-flops. The frequency at which the data signal is sampled is thereby increased over the frequency at which the base clock alone would have sampled the data signal. The higher frequency at which the data signal is sampled is the "oversampling frequency", and the number of clock phases used to initiate the oversampling is the "oversampling factor".

SUMMARY

One aspect of the invention is embodied in a data recovery system. The system comprises first and second data sampling elements, clock and data interpolators, and a current steering mechanism. The clock interpolator receives a first differential clock and outputs a second differential clock. The first differential clock operates the first data sampling element, and the second differential clock operates the second data sampling element. The data interpolator receives and outputs differential data signals. The differential data signal that is received by the data interpolator is sampled by the first data sampling element. The differential data signal that is output from the data interpolator is sampled by the second data sampling element. The current steering mechanism steers current between first and second nodes, the first of which is coupled to bias an input differential pair of the clock interpolator and a delayed differential pair of the data interpolator, and the second of which is coupled to bias an input differential pair of the data interpolator and a delayed differential pair of the clock interpolator.

Another aspect of the invention is embodied in a method for providing an oversampling delay between clock and data signals. The method comprises steering a current between first and second nodes. The first node is coupled to an input differential pair of a clock interpolator and a delayed differential pair of a data interpolator, and the second node is coupled to an input differential pair of the data interpolator and a delayed differential pair of the clock interpolator. First clock and data signals are provided to a first data sampling element and, respectively, to the clock and data interpolators. Second clock and data signals, respectively output from the clock and data interpolators, are provided to a second data sampling element.

Other embodiments of the invention are also disclosed.

BRIEF DESCRIPTION OF THE DRAWINGS

Illustrative and presently preferred embodiments of the invention are illustrated in the drawings, in which.

DESCRIPTION OF THE INVENTION

Figure 1:
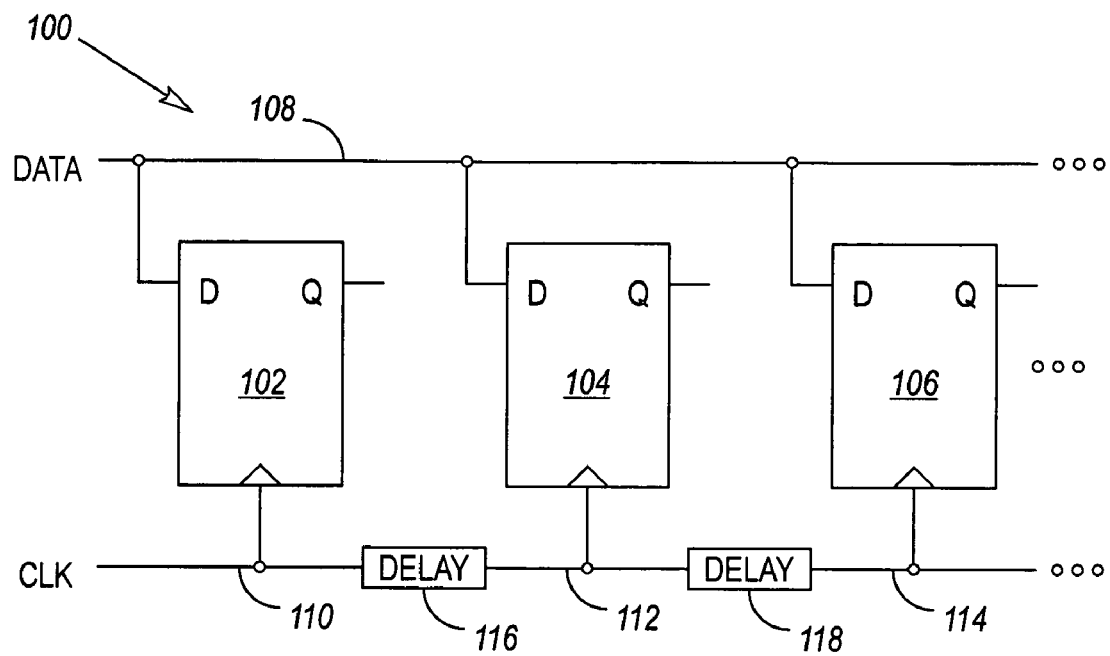
FIG. 1 illustrates a first exemplary data recovery system, wherein a chain of data sampling elements are used to oversample data.

FIG. 1 illustrates a data recovery system 100. The system 100 comprises a chain of data sampling elements 102, 104, 106, each of which receives a common data signal 108, but a different clock signal 110, 112, 114. In one embodiment, the data sampling elements 102-106 are implemented as flip-flops. The clock signals 110-114 represent multiple phases of a base clock 110 (with the base clock 110 itself possibly serving as one of the phases). In the system 100, the different phases 112, 114 of the base clock are generated by passing the base clock 110 through a series of delay elements 116, 118. By way of example, the oversampling period of the system 100 is 0.001 time units.

Preferably, the delay elements 116, 118 are matched, thereby subjecting the data sampling elements 102-106 to a uniform oversampling frequency. However, matching the delay elements 116, 118, without more, does not always provide a uniform oversampling frequency. For example, to achieve a uniform oversampling frequency, the data signal 108 needs to be provided to each of the data sampling elements 102-106 with very little skew. This can be difficult, especially with large oversampling factors. Skew in the data signal 108 shows up as timing error and, as the oversampling frequency is increased, even small timing errors can corrupt data recovery.

Similar to the skew that can show up in the data signal 108, skew can also show up in the various clock phases 110-114. That is, although care may be taken to match the delay elements 116, 118, one must also consider the intrinsic delays of the various clock distribution routes. As with the data signal 108, large oversampling factors make it more difficult to account for these delays.

Skew in either the data or clock distribution routes can be especially problematic when multiple data channels are being oversampled for the purpose of making skew measurements on them.

Figure 2:
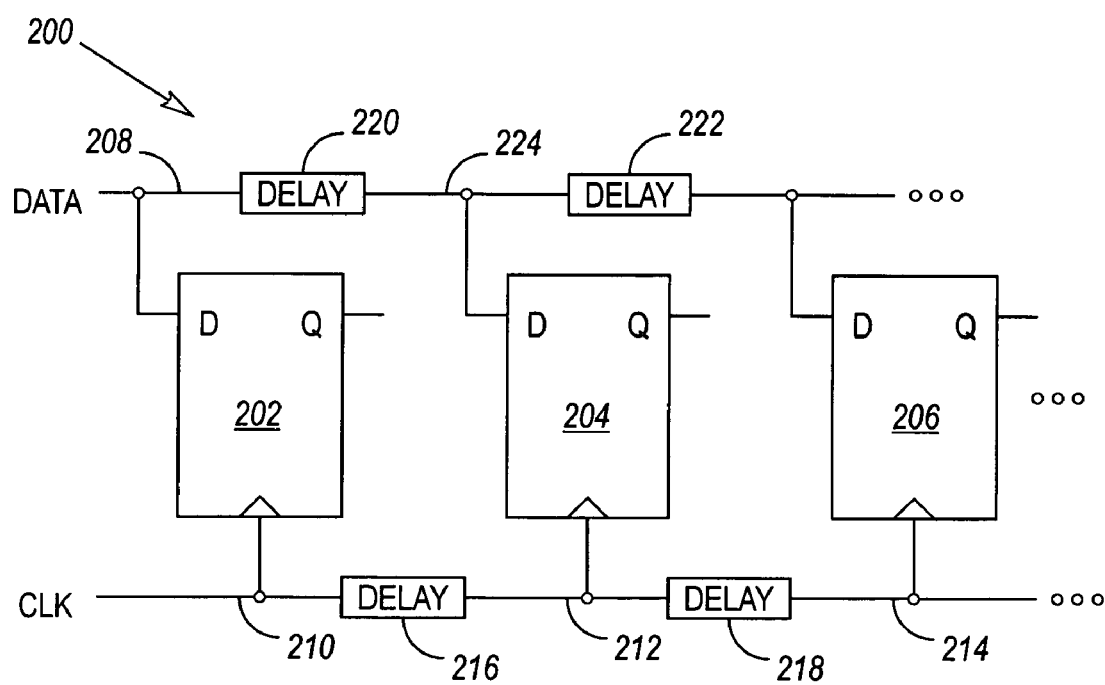
FIG. 2 illustrates a second exemplary data recovery system, wherein a chain of data sampling elements are used to oversample data.

Given the intrinsic delays of the clock and data distribution routes, a better way to model and design a data recovery system is shown in FIG. 2. The data recovery system 200 is similar to the system 100 in that it comprises a chain of data sampling elements 202, 204, 206, as well as a base clock 210 that is passed through a series of delay elements 216, 218 to obtain additional clock phases 212, 214. However, the data recovery system 200 differs in that data signal 208 is passed through delay elements 220, 222.

By way of example, the oversampling period of the system 200 is 0.001 time units. This oversampling period is achieved by subtracting the value of a data delay element (e.g., 220) from its corresponding clock delay element (e.g., 216). That is, 2.001−2.000=0.001.

In part, the delay elements 220, 222 help to model the intrinsic delays of the various data distribution routes. Additionally, the delays imparted by the data delay elements 220, 222 can be used to offset some or all of the delays imparted by the clock distribution routes and/or the clock delay elements 216, 218. However, the insertion of delay elements 220, 222 in the data distribution routes consumes more space and more power. Data delay elements 220, 222 can also reduce data bandwidth, thereby limiting the frequency of the data recovery system 200.

The degree to which corresponding clock and data delay elements 216, 220 can be "almost matched" determines 1) how small of an oversampling period can be achieved with the system 200, and 2) how much the timing resolution of the system 200 can be increased.

Figure 3:
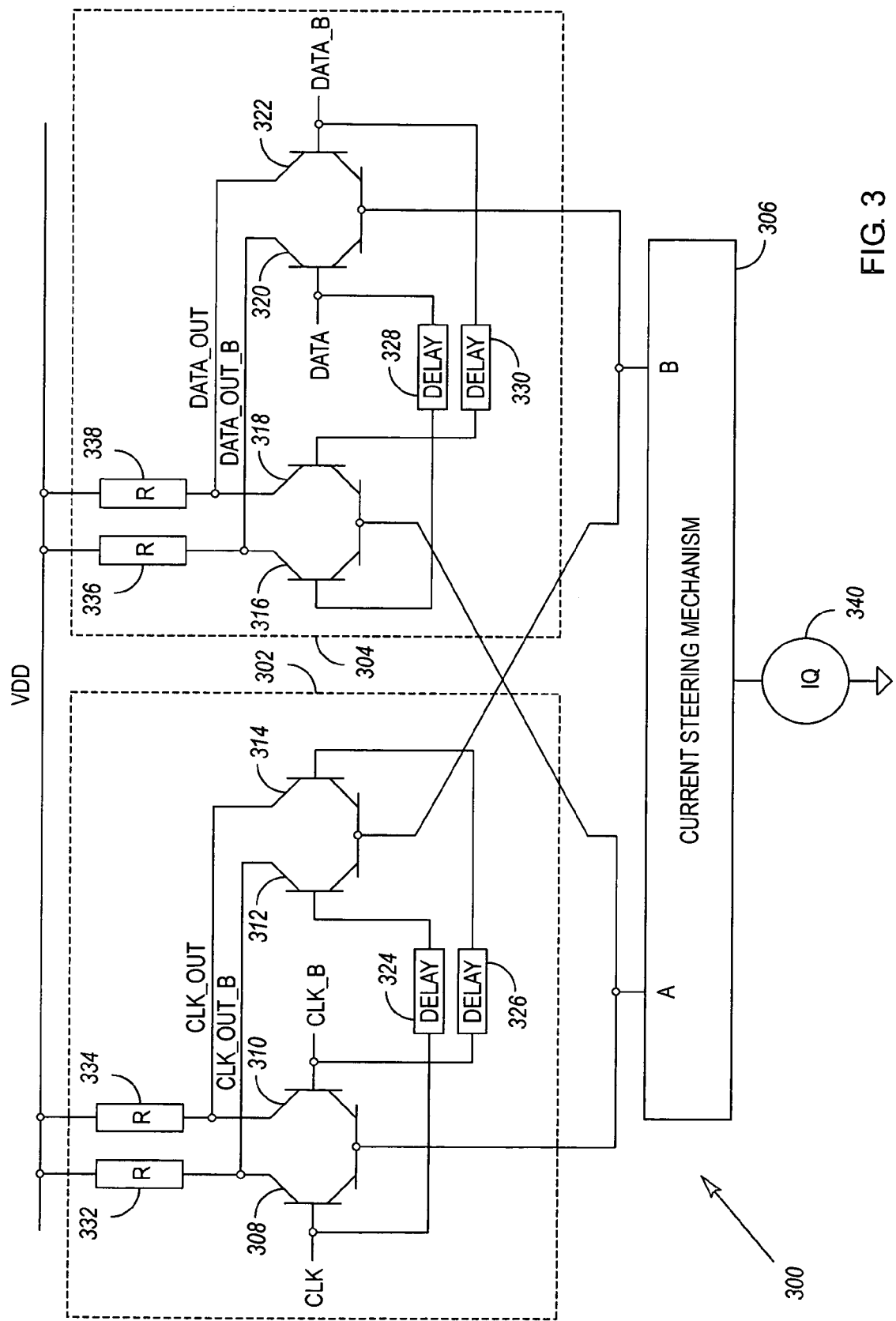
FIG. 3 illustrates a circuit for implementing corresponding delays in the clock and data paths of a data recovery system such as that which is shown in FIG. 2.

FIG. 3 illustrates a circuit 300 for implementing corresponding delays in the clock and data paths of the data recovery system 200.

The circuit 300 comprises a clock interpolator 302 and a data interpolator 304.

The clock interpolator 302 receives a first differential clock (CLK, CLK_B) and outputs a second differential clock (CLK_OUT, CLK_OUT_B). In a similar fashion, the data interpolator 304 receives a first differential data signal (DATA, DATA_B) and outputs a second differential data signal (DATA_OUT, DATA_OUT_B). By way of example, the first differential clock could be carried on line 210 of the system 200 (FIG. 2), and could operate the data sampling element 202. The second differential clock could be carried on line 212 of the system 200, and could operate the data sampling element 204. Likewise, the first differential data signal could be carried on line 208, and could be sampled by the data sampling element 202; and the second differential data signal could be carried on line 224, and could be sampled by the data sampling element 204.

Each of the interpolators 302, 304 comprises an input differential pair 308/310, 320/322 and a delayed differential pair 312/314, 316/318. For each interpolator 302, 304, delay elements 324, 326, 328, 330 couple the bases of corresponding transistors in the interpolator's input and delayed differential pairs. By way of example, each delay element 324-330 may be implemented using a differential pair or an engineered trace.

The collectors of corresponding transistors in each interpolator's input and delayed differential pairs are coupled to a supply voltage (VDD) via a load R 332, 334, 336, 338. The value of each load, R, may be set to $2*V_{sw}/IQ$, where $V_{sw}$ is the desired voltage swing, and where IQ is the amount of current sunk by a current steering mechanism 306.

Preferably, components of the two interpolators 302, 304 are well-matched. That is, the transistors 308-322 are matched, the delay elements 324-330 are matched, the loads 332-338 are matched, and the signal routes are matched.

The circuit 300 also comprises a mechanism 306 to steer current between first and second nodes (i.e., nodes A and B). The first node (node A) is coupled to bias the input differential pair 308/310 of the clock interpolator 302 and the delayed differential pair 316/318 of the data interpolator 304. The second node (node B) is coupled to bias the input differential pair 320/322 of the data interpolator 304 and the delayed differential pair 312/314 of the clock interpolator 302.

By way of example, the current steering mechanism 306 may be implemented using an R/2R ladder of current sinks. The ladder of current sinks may be coupled between the first and second nodes (i.e., nodes A and B) and a current sink IQ 340. The ladder of current sinks may be steered using differential pairs.

If the current steering mechanism 306 is configured to steer equal currents to nodes A and B (and assuming that all components of the interpolators 302, 304 are well-matched), then the delay introduced by the clock interpolator 302 should be equal to the delay introduced by the data interpolator 304. However, if the current steering mechanism 306 is configured to steer more current to node B, node A will sink less current, the clock interpolator 302 will introduce more delay, and the data interpolator 304 will introduce less delay. Thus, the end result is the creation of a controlled oversampling period. If the currents steered to nodes A and B are "almost matched", the oversampling period may be made very small, thereby increasing the timing resolution of the system 200.

If the current steering mechanism 306 is configured to steer all of its current to node B, the clock interpolator 302 will introduce a delay equal to the full value of the delay element 324. Preferably, the matched values of the delay elements 324-330 are less than a rise time of the differential data signal received by the interpolators 302, 304.

In one embodiment of the circuit 300, the current steering mechanism 306 is programmable. In this manner, different ratios of currents may be steered between the mechanism's nodes (i.e., nodes A and B). During the design, test and/or configuration of circuit 300, a user may determine a useful oversampling period by steering different ratios of currents to nodes A and B.

It should be noted that if the clock and data signals of the system 200 (FIG. 2) are differential, the data sampling elements 202, 204 may likewise implement differential data sampling. Alternately, the data sampling elements 202, 204 may convert their differential inputs to single-ended outputs.

It should also be noted that the circuit 300 may be replicated for each of the corresponding clock and data delays in the system 200. Likewise, the circuit 300 may be replicated for multiple data channels. In either case, the insertion delays of the circuit 300 should be matched.

In some embodiments of system 200, the circuit 300 may be used to implement a uniform oversampling frequency. However, the circuit 300 may also be used in systems wherein a known, but non-uniform, oversampling frequency is desired.

Figure 4:
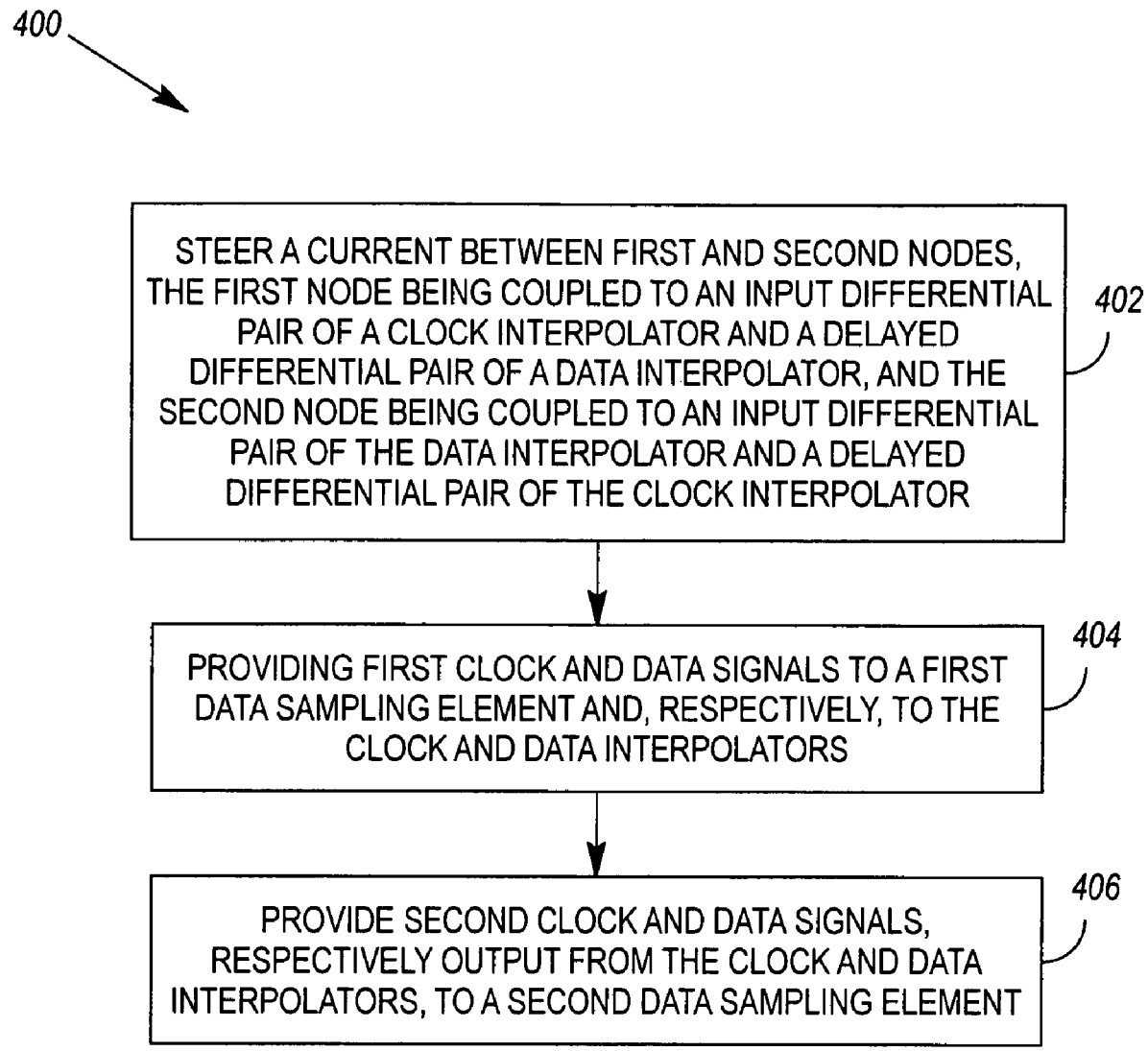
FIG. 4 illustrates a method for providing an oversampling delay between clock and data signals.

FIG. 4 illustrates a method for providing an oversampling delay between clock and data signals. By way of example, the method 400 may be implemented using the system 200 and circuitry 300 shown in FIGS. 2 and 3. The method 400 comprises steering 402 a current between first and second nodes, wherein the first node is coupled to an input differential pair of a clock interpolator and a delayed differential pair of a data interpolator, and wherein the second node is coupled to an input differential pair of the data interpolator and a delayed differential pair of the clock interpolator. First clock and data signals are then provided 404 to a first data sampling element and, respectively, to the clock and data interpolators. Second clock and data signals, respectively output from the clock and data interpolators, are provided 406 to a second data sampling element. Optionally, the second clock and data signals may be provided to inputs of a chain of N more clock and data interpolators, and clock and data outputs of the chain of clock and data interpolators may be provided to N additional data sampling elements.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A data recovery system, comprising:
first and second data sampling elements;
a clock interpolator to receive a first differential clock and output a second differential clock, said first differential clock operating the first data sampling element, and said second differential clock operating the second data sampling element;

a data interpolator to receive and output differential data signals, said received differential data signal being sampled by the first data sampling element, and said output differential data signal being sampled by the second data sampling element; and a mechanism to steer current between first and second nodes, the first node being coupled to bias an input differential pair of the clock interpolator and a delayed differential pair of the data interpolator, and the second node being coupled to bias an input differential pair of the data interpolator and a delayed differential pair of the clock interpolator.

2. The data recovery system of claim 1, wherein the mechanism to steer current is configured to steer more current to the second node.

3. The data recovery system of claim 1, wherein matched delays between the input and delayed differential pairs are implemented via matched traces.

4. The data recovery system of claim 1, wherein matched delays between the input and delayed differential pairs are less than a rise time of the received differential data signal.

5. The data recovery system of claim 1, wherein the current steering mechanism is programmable to steer different ratios of currents to the first and second nodes.

6. A method for providing an oversampling delay between clock and data signals, comprising:

steering a current between first and second nodes, said first node being coupled to an input differential pair of a clock interpolator and a delayed differential pair of a data interpolator, and said second node being coupled to an input differential pair of the data interpolator and a delayed differential pair of the clock interpolator;

providing first clock and data signals to a first data sampling element and, respectively, to said clock and data interpolators; and providing second clock and data signals, respectively output from the clock and data interpolators, to a second data sampling element.

7. The method of claim 6, further comprising:

providing the second clock and data signals to inputs of a chain of N more clock and data interpolators; and providing clock and data outputs of the chain of clock and data interpolators to N additional data sampling elements.

8. The method of claim 6, further comprising, steering more current to the second node.

9. The method of claim 6, further comprising, steering different ratios of currents to said first and second nodes to determine a useful oversampling period.

* * * * *